United States Patent [19]

Schmidt

[11] 3,714,697

[45] Feb. 6, 1973

[54] FILM CHIP STRIPPER

[75] Inventor: Gunter Schmidt, Malibu, Calif.

[73] Assignee: Production, Inc., Los Angeles, Calif.

[22] Filed: Oct. 12, 1970

[21] Appl. No.: 80,083

Related U.S. Application Data

[62] Division of Ser. No. 732,186, May 27, 1968, Pat. No. 3,559,554.

[52] U.S. Cl. ......................29/239, 95/90.5, 156/584, 250/66, 53/381 R

[51] Int. Cl.........................G03d 13/08, G03d 17/00

[58] Field of Search ..............29/239; 250/69, 70, 66; 95/90.5; 271/64, 74 R; 53/381 R, 381 A; 156/584

[56] References Cited

UNITED STATES PATENTS

| | | | |
|---|---|---|---|
| 2,562,877 | 8/1951 | Balluff | 95/90.5 |
| 3,074,713 | 1/1963 | Sano | 53/381 R X |
| 3,075,080 | 1/1963 | Sano | 250/66 |
| 3,105,903 | 10/1963 | Sano et al. | 250/66 |
| 3,266,797 | 8/1966 | Stievenart | 156/584 X |
| 3,286,092 | 11/1966 | Sames | 250/66 X |
| 3,374,351 | 3/1968 | Sano et al. | 250/66 |
| 3,410,551 | 11/1968 | Tiger et al. | 271/64 |
| 3,452,980 | 7/1969 | Yanagawa | 271/64 |
| 3,547,745 | 12/1970 | Winston | 156/584 |

*Primary Examiner*—Travis S. McGehee
*Assistant Examiner*—Horace M. Culver
*Attorney*—Lindenberg, Freilich & Wasserman

[57] ABSTRACT

Apparatus which can be used in a lighted room to strip the coverings from a film chip which is held in a protective package and insert the chip into a light-tight magazine. The stripping apparatus includes a hub that engages a tab on the film chip package to peel off an outer layer, and an assembly that holds another protective layer of the package away from the film chip while a roller moves the chip toward a slot that leads to the magazine.

3 Claims, 10 Drawing Figures

INVENTOR.
GUNTER SCHMIDT
BY
Lindenberg Freilich & Wasserman
ATTORNEYS

PATENTED FEB 6 1973 3,714,697

SHEET 2 OF 3

INVENTOR.
GUNTER SCHMIDT

BY

Lindenberg, Freilich & Wasserman

ATTORNEYS

INVENTOR.
GUNTER SCHMIDT
BY
Lindenberg, Freilich & Wasserman
ATTORNEYS

FILM CHIP STRIPPER

CROSS-REFERENCES TO RELATED APPLICATIONS

This is a division of Ser. No. 732,186, filed May 27, 1968, now U.S. Pat. No. 3,559,554.

BACKGROUND OF THE INVENTION

1. Field of the Invention

This invention relates to apparatus for stripping the protective covering from a film chip that is held in a package.

2. Description of the Prior Art

Dental X-ray photographs are generally made using film packages that comprise a small stiff chip of film. This film chip is covered on both faces by a thin cardboard sandwich, a sheet of lead on one side of the cardboard sandwich, and a soft plastic covering that completely envelopes the other layers. The developing of such film chips has generally required darkrooms, wherein the package was hand opened and the film chip developed or loaded into a magazine for later developing either in the darkroom or in a light-tight automatic developing machine. In dental offices that process their own film, the necessity for a darkroom results in a waste of space and in annoyance in performing operations in the dark.

OBJECTS AND SUMMARY OF THE INVENTION

One object of the present invention is to provide apparatus for processing dental film in an ordinary lighted room.

Another object is to provide apparatus for stripping a covering from a film chip and feeding the chip into a light-tight magazine, which enables the operation to be performed in an ordinary lighted room.

In accordance with the present invention, apparatus is provided which strips away the protective covering on a film chip and inserts the chip into a light-tight magazine or other device, while protecting the film chip from ambient light. The stripping apparatus comprises a peeling assembly for removing the outer covering on the film chip package. It also includes a separation assembly for separating the film chip from other protective layers and moving only the chip toward an exit slot, where the chip can fall into a transfer magazine or directly in a developing machine.

The peeling assembly includes a slotted hub for receiving a tab formed on the outside of chip packages. With a chip package tab engaged in the slot, a knob on the outside of the housing is turned to peel away the outer package cover. During peeling, the film chip and its protective layers are moved to the separation assembly. The latter assembly includes a bar that engages a cardboard protective layer lying against the film chip, to hold the layer out of the way, and a roller that engages the film chip to move only the chip toward the exit slot. Where the chip is to be deposited in a transfer magazine which can carry it to a developing machine, the magazine is held on the other side of the exit slot to receive the film chip.

The novel features of the invention are set forth with particularity in the appended claims. The invention will be best understood from the following description when read in conjunction with the accompanying drawings.

DESCRIPTION OF THE PREFERRED EMBODIMENTS

Figures 1, 2:
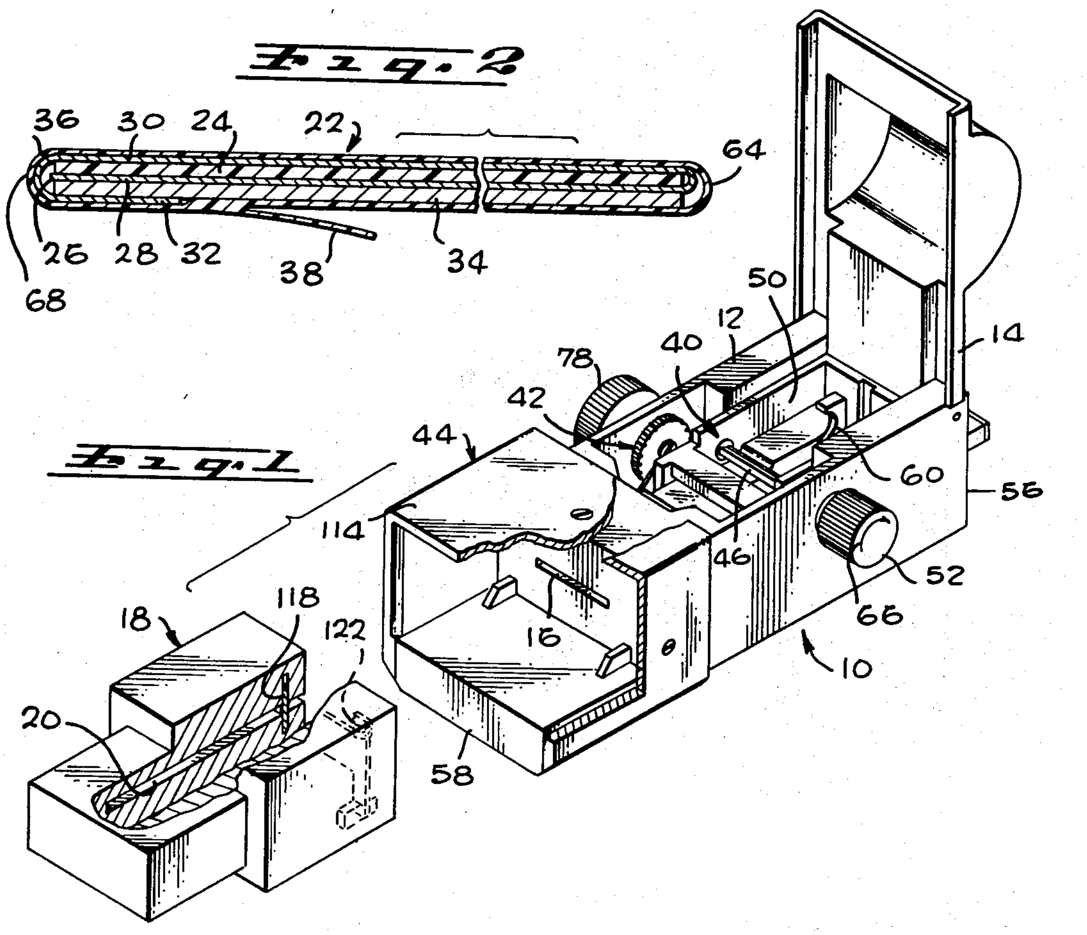
FIG. 1 is an isometric view of a stripper apparatus constructed in accordance with the invention.
FIG. 2 is a sectional view of a dental film chip package, of a type which can be used in the stripper apparatus of FIG. 1.

FIG. 1 illustrates a stripper apparatus 10 comprising a housing 12 which receives a dental film chip package. With a cover 14 closed over the housing, the apparatus removes all of the protective coverings on the film chip within the package and moves the chip through an exit slot 16. A light-tight magazine 18 is positioned against the exit slot, to receive the film chip into its magazine chamber 20. The magazine is then removed from the housing and can be inserted into a developing apparatus to develop the film chip. It should be understood that the stripper apparatus 10 may be coupled directly to a developing machine that is designed to receive it, so that in many cases no intermediate transfer magazine is required.

FIG. 2 is an enlarged sectional view of a typical dental film chip package of a type which can be stripped by the stripper apparatus of the invention. The package 22 comprises a film chip 24 which is typically a stiff sheet of transparent plastic with a photographic emulsion thereon. A sandwich 26 of thin stiff cardboard is disposed against the two faces of the film chip. The cardboard sandwich includes a lower sheet 28 disposed against the lower face of the film chip, an upper sheet 30 disposed against the upper face of the film chip, and a flap 32. A lead sheet 34 is disposed against the lower cardboard sheet, and the cardboard flap 32 extends around the lead sheet. An encapsulating envelope 36 of soft plastic is disposed around the other layers, including the sides of the layers, to form a light-tight capsule or package. A tab 38 is formed in the encapsulating envelope, on a face thereof adjacent to the lead sheet.

Hand opening of the package 22 is generally accomplished by pulling on the tab 38 to tear away the encapsulating envelope. The cardboard flap 32 is lifted and the film chip 24 is removed from the cardboard sandwich, for developing. The stripper apparatus of the invention is constructed to strip away the protective covering on the film chip to prepare it for developing, while protecting the chip from ambient light, thereby eliminating the need for a darkroom.

The stripper apparatus 10 may be considered to comprise three assemblies for performing three main functions in readying the film chip for developing. A stripping or peeling assembly 40 is provided which serves to peel away the encapsulating envelope 36 of the film chip package. A separation and transport assembly 42 is provided which receives the chip package with the envelope removed, separates the film chip 24 from the cardboard and lead sheets, and moves only the film chip toward the exit slot 16. A magazine receiving assembly 44 on the forward end 58 of the housing holds the magazine 18. The receiving assembly holds the magazine in position to receive a film chip that passes through the exit slot, and prevents light from reaching the chip during transfer into the magazine.

Figure 3:
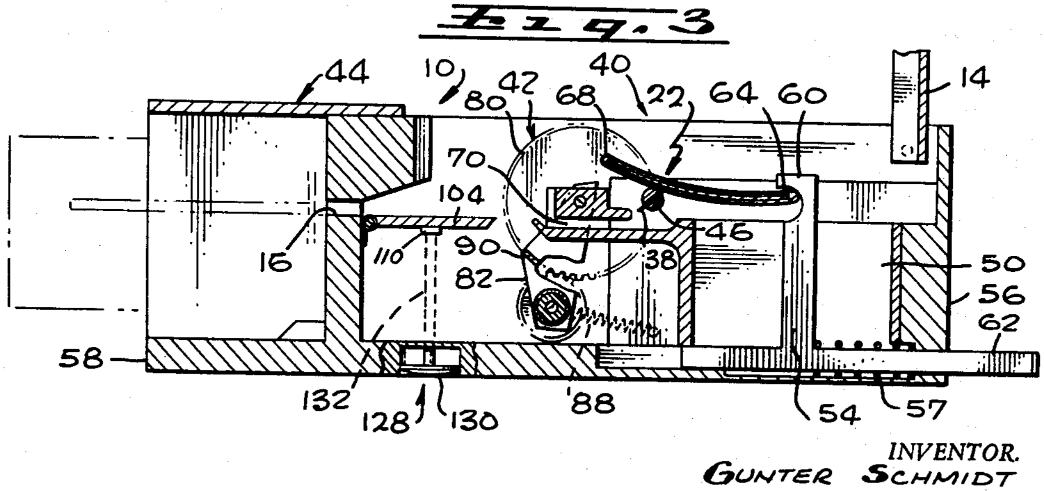
FIG. 3 is a sectional, side elevation view of the stripper apparatus of FOG. 1, shown during the initial loading of a film chip package therein.

As shown in FIG. 3, the stripping assembly 40 comprises a stripping hub 46 formed by two closely spaced bars that define a slot 48 between them. The stripping hub is rotatably supported at opposite ends on the walls of a bed 50 disposed within the housing. One end of the hub 46 projects through the side of the housing, and carries a stripper knob 52 which can be hand turned to rotate the hub. The slot 48 in the stripping hub is adapted to receive the tab 38 on a film chip package. The stripper knob 52 is then turned to rotate the hub, to peel off the encapsulating envelope of the package starting with the tab.

The stripping assembly 40 also includes an indicator bar 54 which is constrained to sliding movement by slots in the bed 50 and the rearward or back end 56 of the housing. A spring 57 biases the indicator bar toward the front end 58 of the housing. The indicator bar has a film engaging portion 60 including a circular cutout which receives one end of a film package. In the course of peeling the outer envelope, the film package moves toward the back end of the housing and then forward, thereby moving the film engaging portion 60 of the indicator bar backward and then forward. The indicator bar has an indicator end 62 which projects from the rear of the housing. The indicator end 62 moves backward and then forward in the course of the peeling operation. It serves to indicate that the peeling operation is progressing satisfactorily, and also to indicate when the peeling operation is completed.

The stripper apparatus 10 is utilized by lifting the cover 14 and placing the film package 22 within the housing, as shown in FIG. 3. The tab 38 of the package is inserted into the slot 48 of the stripping hub, while the rearward end 64 of the package, which is furthest from the tab, is engaged in the film engaging portion 60 of the indicator bar. The cover 14 is then closed over the housing to provide a light-tight seal for the film package. Next, the stripper knob 52 is rotated in the clockwise direction shown by the arrow 66 of FIG. 1, to rotate the stripping hub.

Rotation of the stripping hub 46 causes the encapsulating envelope to be peeled off of the package and wound about the hub. The rest of the package is prevented from turning by the film engaging portion 60 of the indicator bar, although in the absence of portion 60, the bed 50 would serve this function. During the initial stripping of the bottom portion of the envelope, the film package 22 moves rearwardly, thereby pushing the indicator bar 54 rearwardly. Such rearward movement continues until the hub has peeled the envelope up to the forward end 68. Further turning of the stripper knob causes the forward end 68 of the package to move under the stripping hub to the position shown in FIG. 4.

Figure 4:
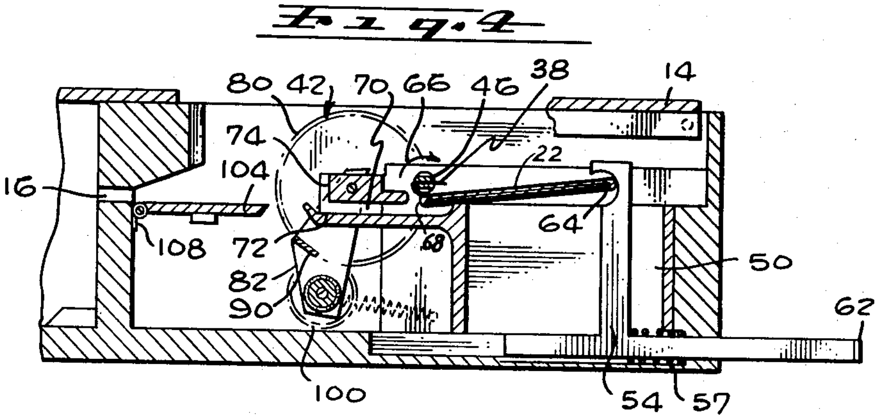
FIG. 4 is a partial sectional view of the stripper apparatus shown in the course of the outer cover peeling operation.

During the initial peeling, while the package moves from the position shown in FIG. 3 to that shown in FIG. 4, the indicator end 62 of the indicator bar moves rearwardly and then begins to move forward again. The person operating the stripper apparatus can determine whether the package is being properly stripped by noting whether the indicator end 62 moves rearwardly during the initial turning of the stripper knob. If the indicator end 62 does not move rearwardly, the probable cause is that the envelope tab 38 has slipped out of the stripping hub slot. If this occurs, the cover must be raised for reinsertion of the tab in the slot. The positive indication provided by the indicator end 62 is extremely important, inasmuch as opening the cover after actual peeling has begun can expose the film chip to light and ruin the photograph.

Turning of the stripper knob to rotate the stripping hub continues after the position shown in FIG. 4 has been reached. During subsequent turning, the top layer of the encapsulating envelope is peeled off of the film package 22. At the same time, the front end 68 of the film package moves under the stripping hub and into a passageway 70 formed between a lower guide 72 and an upper guide 74 that extend across the bed 50 at a position forward of the stripper hub. As the film packages moves through the passageway, the indicator bar 54 moves forward until the indicator end 62 reaches a forward position where it barely projects from the rear of the housing.

When the encapsulating envelope of the film package has been stripped back to the rear end 64, only a small portion of the encapsulating layer is still on the package, this last portion extending along the bottom surface of the package. It is not necessary to wind this last portion on the stripping hub, although no harm is done by winding it thereon. Thus, the stripping knob 52 can be turned until the indicator end 62 of the indicator bar reaches its most forward position, and the turning can then be either stopped or continued. The fact that the indicator end has reached its forward position indicates that the next operation can be performed.

Figure 8:
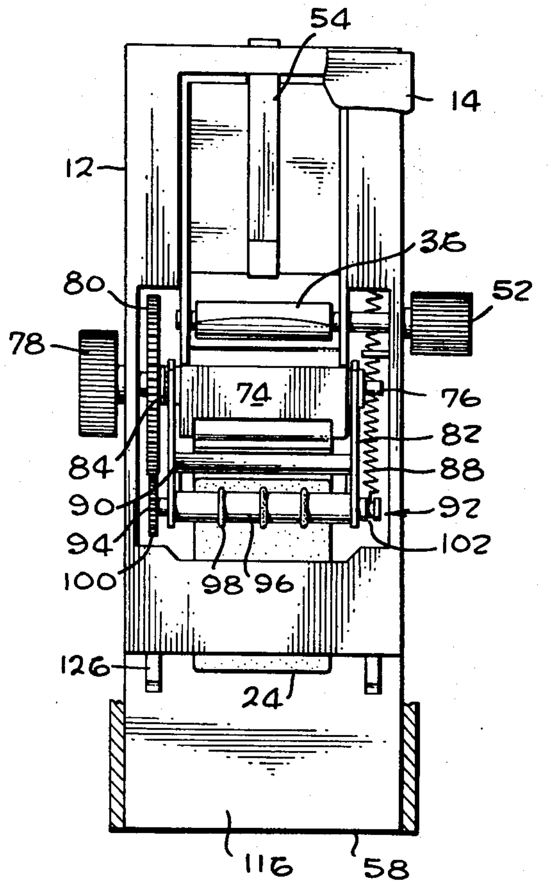
FIG. 8 is a plan view of the apparatus of FIG. 1 with the cover removed, shown during the operation step of FIG. 7.
Figure 3A:
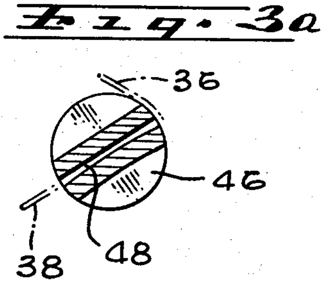
FIG. 3*a* is an enlarged partial view shown at the same stage of operation.
Figure 6A:
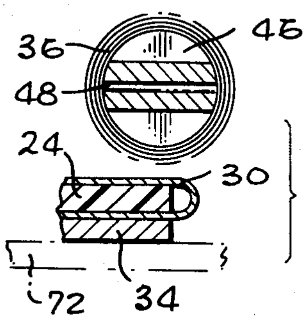
FIG. 6*a* is an enlarged partial view shown at the same stage of operation.
Figure 5:
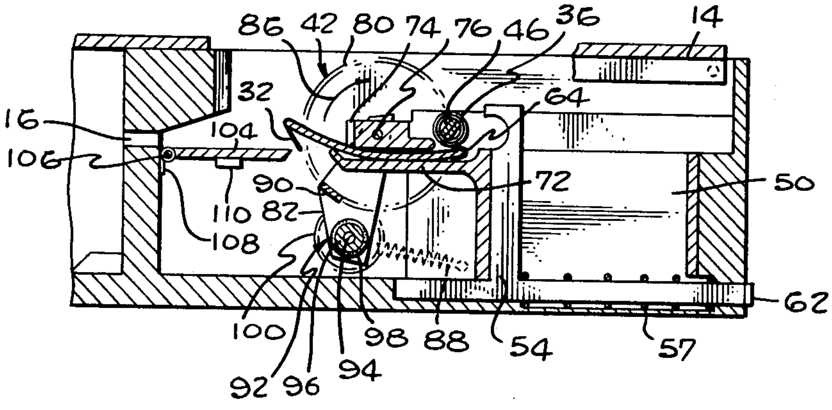
FIG. 5 is a partial sectional view of the stripper apparatus shown near the end of the outer cover peeling operation.

The next operation in the disassembly of the film package is the separation of the cardboard sandwich 26 from the film chip, and the movement of only the film chip towards the exit slot 16. This is accomplished by the separation assembly 42. As shown in FIGS. 5 and 8, the separation assembly comprises a shaft 76 rotatably mounted in the upper guide 74. The shaft has an outer end extending through a side of the housing and fixed to a transport knob 78. A gear 80 is fixed to the shaft 76 at a position between the upper guide 74 and the walls of the housing. An arm assembly 82 which includes two spaced arms, has an inner end rotatably mounted on the transport shaft 76. The arm assembly is confined to rotation around the shaft, but can rotate independently of it. However, a ratchet wheel mechanism 84 is provided which allows the transport shaft to turn the arm assembly 82 in a clockwise direction shown by the arrow 86. A spring 88 tends to rotate the arm in a counterclockwise direction.

The middle portions of the arms of the arm assembly 82 are connected by a laterally extending separator bar 90. The outer ends of the arms carry a roller assembly 92. The roller assembly comprises a roller shaft 94 extending laterally between the two arms 82 and pivotally supported thereon. A roller 96 is fixed to the roller shaft and extends between the arms. Three rubber O-rings 98 are disposed on the roller at three locations along its width. A pinion 100 is fixed to the roller shaft at a position between one of the arms and the housing, so that the teeth of the pinion are engaged with those of the gear 80. A groove 102 at the opposite end of the roller shaft carries one end of the spring 88.

Figure 6:
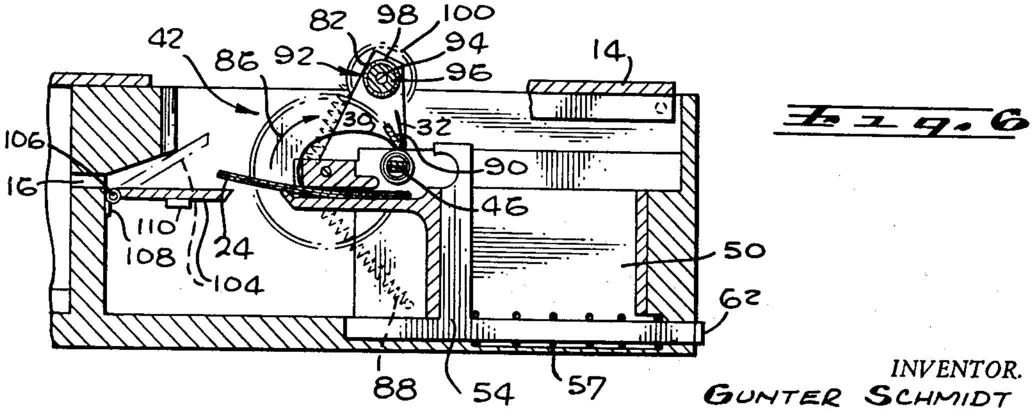
FIG. 6 is a partial sectional view of the stripper apparatus shown during the separation operation.

After the encapsulating envelope has been peeled from the film package, the package lies in the position shown in FIG. 5. The next step in the package disassembly process is the operation of the separation and transport assembly 42, which is accomplished by rotation of the transport knob 78 in the direction of the arrow 86. As the knob is rotated, the ratchet assembly engages the arms of assembly 82 and rotates them toward an upward position shown in FIG. 6. During rotation of the arms, the roller assembly strikes a platform 104, which is pivoted at 106. The platform is biased downwardly by a spring 108, but is prevented from movement below the horizontal by a stop 110. The roller assembly pushes up the platform until the platform is passed. The arms then move to the position shown in FIG. 6.

Figure 7:
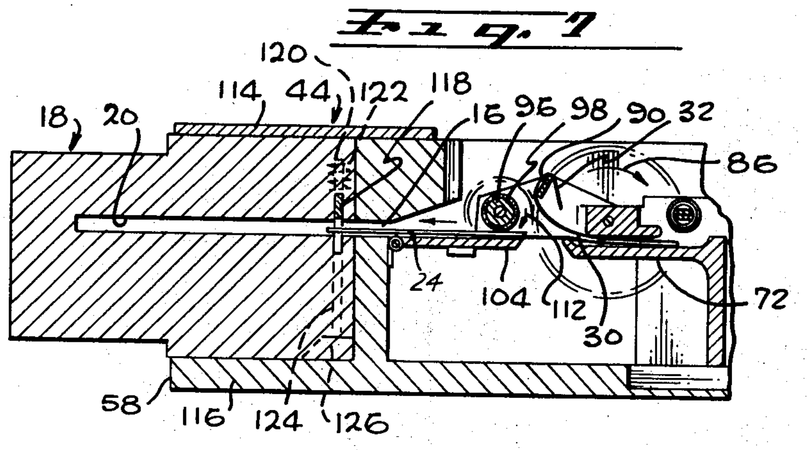
FIG. 7 is a partial sectional view of the stripper apparatus during the transport of a film chip into a magazine.

During upward movement of the arms, the separator bar 90 engages the cardboard flap 32 of the film package. This causes the upper sheet 30 of cardboard to be lifted off of the film chip 24. During the lifting operation, the film chip may be bent upward slightly, until it clears the roller assembly, but it then springs back to the position shown in FIG. 6. When the transport knob 78 is rotated far enough that the separator bar 90 strikes an upper surface of the bed 50, the knob cannot be rotated any further. The transport knob is then rotated in the opposite direction. This allows the arms 82 to move down until the rubber rings 98 on the roller shaft 94 lie on the film chip 24. The film chip and the cardboard and lead sheets under it are then supported on the platform 104, as shown in FIG. 7. The separator bar is maintained above the platform because part of the periphery of the O-rings lies behind the separator bar with respect to rotation in the direction of arrow 86.

Rotation of the transport knob 78 is continued in the direction opposite to that of the arrow 86 while the apparatus is in the configuration of FIG. 7. This causes the gear 80 to rotate the pinion 100 in the direction of the arrow 112. Such rotation causes the rubber rings 98 on the roller to move the film chip 24 toward the exit slot 16. Only the film chip is moved, inasmuch as the cardboard sandwich is still held back, by reason of the engagement of the separator bar 90 with the flap 32 of the sandwich. Finally, the film chip is about half way through the exit aperture 16, and the rubber rings on the roller 96 bear against the cardboard sandwich and the lead sheet thereunder. Any further rotation of the transport knob merely causes the rubber rings to slip on the cardboard sandwich.

The final movement of the film chip 24 into the magazine chamber 20 is accomplished by picking up the entire stripper assembly and holding it with the front end 58 pointed down. The chip 24 then falls into the magazine chamber. The magazine 18 is held in position with its chamber 20 aligned with the exit slot 16 by the magazine receiving assembly 44. The receiving assembly comprises a shroud 114 which fits around a base 116 at the forward end of the housing, to provide a space for receiving the magazine. The shroud 114 forms a protective cover to shield the film chip 24 against light during its passage through the exit slot 16 into the magazine.

The magazine has a cover 118 which moves within a slot in the magazine. The cover has a pair of upwardly extending legs, shown at 120, on either side. Springs 122 disposed about each leg bias the cover toward a downward position wherein the cover is closed over the end of the magazine chamber. The cover also has a pair of downwardly extending legs 124. Bosses 126 fixed to the base 116 engage the legs 124 to move them and the cover 118 upwardly. When the cover 118 is moved up, the film chip can slide into the magazine chamber. After the film chip is in the chamber, the magazine 18 is pulled out of the space enclosed by the shroud 114. The legs 124 become disengaged from the boss 126, and the cover 118 over the magazine chamber moves down to cover the chamber and prevent light from entering therein. Thus, the legs 120 and 124 serve as cover moving means for moving the magazine cover over and away from the chamber opening, and the bosses on the housing operate these cover moving means by pushing the legs up and allowing them to move down.

After the magazine 18 is removed from the housing, the housing cover 14 can be lifted, and the various package coverings that have been removed from the film chip package can be removed from the housing. The stripping apparatus 10 is then ready to receive the next film package to strip it. Prior to insertion of the next film package, in the housing, the platform 104 should be lifted to allow the arm assembly 82 to move under the platform. In case the operator should forget to do this, and proceeds to strip the next package, the forward end of the film package will abut the roller assembly 92, and the operator will notice a resistance to rotation of the stripper knob 52. A release assembly 128, shown in FIG. 3, provides a button 130 which can be pushed from outside the housing to raise the platform 104. The button is coupled to a rod 132 that can raise the platform stop 110. As described above, the various peeling, separation and insertion operations are performed merely by turning two knobs on the housing. All of the required operations can be performed in an ordinary lighted room, and in a simple manner.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. Apparatus for disassembling a film chip package which includes a light-tight envelope with tab means thereon, to move only the film chip into further handling apparatus comprising:

a substantially light-tight housing;

hub means rotatably mounted in said housing for engaging said tab means on said package;

means within said housing for preventing substantial rotation of said package, including indicator means engageable with an end of said film package and biased toward said hub means and observable from outside said housing for providing an indication of the movement of said film chip package;

means for rotating said hub means to remove said envelope on said package;

exit means for the discharge of said film chip;

means for coupling said exit means to said further handling apparatus; and means for moving said film chip toward said exit means.

2. Apparatus for disassembling a film chip package which includes a film chip, a sandwich disposed on opposite faces of said chip with a flap thereon, and an encapsulating envelope with a tab, comprising:

a housing having forward and rearward end portions, and having a cover for permitting access to the inside of the housing;

a hub with means for receiving said tab, said hub rotatably mounted within said housing;

means for engaging said film chip package to prevent its substantial rotation;

means defining a passageway having an entrance beside said hub and an exit area disposed forward of said entrance;

means for rotating said hub to peel said envelope and move the remainder of said package into said passageway;

exit means formed at said forward end portion of said housing;

a platform positioned immediately rearwardly of said exit area;

an arm rotatably mounted on said housing;

separator bar means mounted on said arm for movement across said exit area of said passageway from a first side thereof to a second side thereof to engage said flap on said film chip sandwich;

roller means rotatably mounted on said arm outwardly of said separator bar means for movement across the position of said platform, said roller means mounted at a position wherein a peripheral portion thereof lies angularly behind said bar means with respect to motion of said arm from said first to said second sides of said passageway exit area;

means for rotating said arm in a first direction from said first to said second sides of said passageway exit area, and for rotating said arm in the opposite direction;

means for supporting said platform against movement out of the way of said roller means during only the rotation of said roller means in said opposite direction; and means for rotating said roller means while it lies substantially against said platform.

3. Apparatus for disassembling a film chip package which includes a film chip with a first face covered by a protective layer having a flap thereon and a light-tight envelope with tab means thereon, to move only the film chip into further handling apparatus comprising:

a substantially light-tight housing:

hub means rotatably mounted in said housing for engaging said tab means on said package;

means within said housing for preventing substantial rotation of said package;

means for rotating said hub means to wind said envelope on said package, so that the envelope is at least partially stripped from the package;

separator means having a bar moveable in said housing across the film package to engage and move said flap in a direction initially substantially perpendicular to the protective layer, to lift the protective layer away from said first face of said film chip;

exit means for the discharge of said film chip; and means for moving said film chip toward said exit means.

* * * * *